(12) United States Patent
Okada et al.

(10) Patent No.: US 6,254,761 B1
(45) Date of Patent: Jul. 3, 2001

(54) METHOD OF PREPARING A CONDUCTIVE POLYMER FOR ELECTRODE AND METHOD OF FORMING AN ELECTRODE

(75) Inventors: Shinako Okada; Toshihiko Nishiyama; Masaki Fujiwara; Gaku Harada; Masato Kurosaki, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/528,712

(22) Filed: Mar. 20, 2000

(30) Foreign Application Priority Data

Mar. 19, 1999 (JP) .................................................. 11-076314

(51) Int. Cl.⁷ ....................................................... C25B 5/00

(52) U.S. Cl. ............................ 205/414; 205/431; 205/688
(58) Field of Search ..................................... 205/414, 431, 205/688

(56) References Cited

U.S. PATENT DOCUMENTS 5,876,586 * 3/1999 Fukushima et al. .................. 205/414

* cited by examiner

*Primary Examiner*—Arun S. Phasge
(74) *Attorney, Agent, or Firm*—Young & Thompson

(57) ABSTRACT

A method of producing a conductive polymer comprises the following steps of depositing a solid-state organic compound and contacting a collector with an electrolytic solution thereby to cause an electrolytic polymerization of said organic compound.

16 Claims, 5 Drawing Sheets oxidation potential of 1,5-diaminoanthraquinone electrolytic polymerization of 1,5-diaminoanthraquinone electrolytic polymerization of 1,5-diaminoanthraquinone

METHOD OF PREPARING A CONDUCTIVE POLYMER FOR ELECTRODE AND METHOD OF FORMING AN ELECTRODE

BACKGROUND OF THE INVENTIONS

The present invention relates to a method of preparing a conductive polymer material for an electrode and a method of forming an electrode using a conductive polymer material, and more particularly to a method of producing a conductive material suitable for a mass-synthesis thereof at a high yield and a method of forming an electrode at a high productivity.

A conductive material has been developed which is to be formed on a surface of an electrode for a secondary battery or a capacitor. The conductive polymer material has been prepared as follows. FIG. 1 is a view illustrative of a conventional method of preparing the conductive polymer material. An organic compound 2 is dissolved into an electrolytic solution 3, wherein the organic compound 2 comprises a monomer or a low molecular weight polymer of organic molecules which have a skeleton allowing formation of a conductive polymer material. A collector 1 is dipped into the electrolytic solution 3 dissolved with the organic compound 2 in order to cause an electrolytic polymerization of the above monomers or the above low molecular weigh, thereby obtaining a conductive polymer material. If the obtained conductive polymer material is soluble to the electrolytic solution, the conductive polymer material dissolved in the electrolytic solution is then subjected to a solvent extraction so as to isolate the conductive polymer material from the electrolytic solution.

The conventional method of producing the conductive polymer material has the following problems. The organic compound 2 shows a reaction on the collector 1. In this reaction, a diffusion process is caused where the organic compound 2 is diffused in the electrolytic solution 3 up to the collector 1. A diffusion rate or a diffusion speed depends upon the organic compound 2 and a solvent of the electrolytic solution 3. In general, the diffusion rate is slow and is a rate-determining step of polymerization. The rate of the polymerization depends upon a concentration of the organic compound 2. If a solubility of the organic compound to the solvent of the electrolytic solution 3 is low, it is difficult to obtain a high concentration of the organic compound 2 in the electrolytic solution 3, for which reason a current density in polymerization process or a polymerization current density is low, whereby it is difficult to obtain a high productivity or a high yield of polymerization. Namely, the conventional method is engaged with the problem in low polymerization yield in the electrolytic polymerization.

The above conventional method illustrated in FIG. 1 has a further problem as follows. An amount of the organic compound 2 soluble into the solvent for the electrolytic solution 3 is limited. Namely, the organic compound 2 has a maximum solubility into the solvent for the electrolytic solution 3. If the maximum solubility of the organic compound 2 into the solvent for the electrolytic solution 3 is low, then it is difficult to realize a moss-synthesis.

Consequently, the conventional method of producing the conductive polymer is disadvantageous in low yield and low productivity, and a difficulty in mass-synthesis.

In the above circumstances, it had been required to develop a novel method of producing a conductive polymer free from the above problem.

SUMMARY OF THE INVENTION

Accordingly, it is an object of the present invention to provide a novel method of producing a conductive polymer free from the above problems.

It is a further object of the present invention to provide a novel method of producing a conductive polymer at a high yield.

It is a still further object of the present invention to provide a novel method of producing a conductive polymer at a high productivity.

It is yet a furher object of the present invention to provide a novel method of producing a conductive polymer, which is suitable for mass-synthesis.

It is moreover object of the present invention to provide a novel method of forming an electrode using a conductive polymer free from the above problems.

It is still more object of the present invention to provide a novel method of forming an electrode using a conductive polymer at a high yield.

It is yet more object of the present invention to provide a novel method of forming an electrode using a conductive polymer at a high productivity.

In accordance with the first present invention, a method of producing a conductive polymer comprises the following steps. An organic compound is deposited on a surface of a collector, wherein the organic compound has a polymerizability and is in a solid-state. The collector is made into contact with an electrolytic solution thereby to cause an electrolytic polymerization of said organic compound. As a result, large amount of reacted substances exist on the surface of the collector. The organic compound in the solid-state has been deposited on the collector before the collector is dipped into the electrolytic solution, whereby the electrolytic polymerization of the organic compound is caused. The organic compound in the solid-state is in contact with the collector in the electrolytic polymerization. This means that the organic compound is in contact with the collector at a high concentration, whereby a large current density of the electrolytic polymerization can be obtained, so that a productivity can be improved. Namely, in accordance with a novel method of producing a conductive polymer, a polymerizable organic compound in a solid-state on a collector is in contact with an electrolytic solution to cause an electrolytic polymerization of the organic compound at a high current density of the electrolytic polymerization, so that a productivity can be improved.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
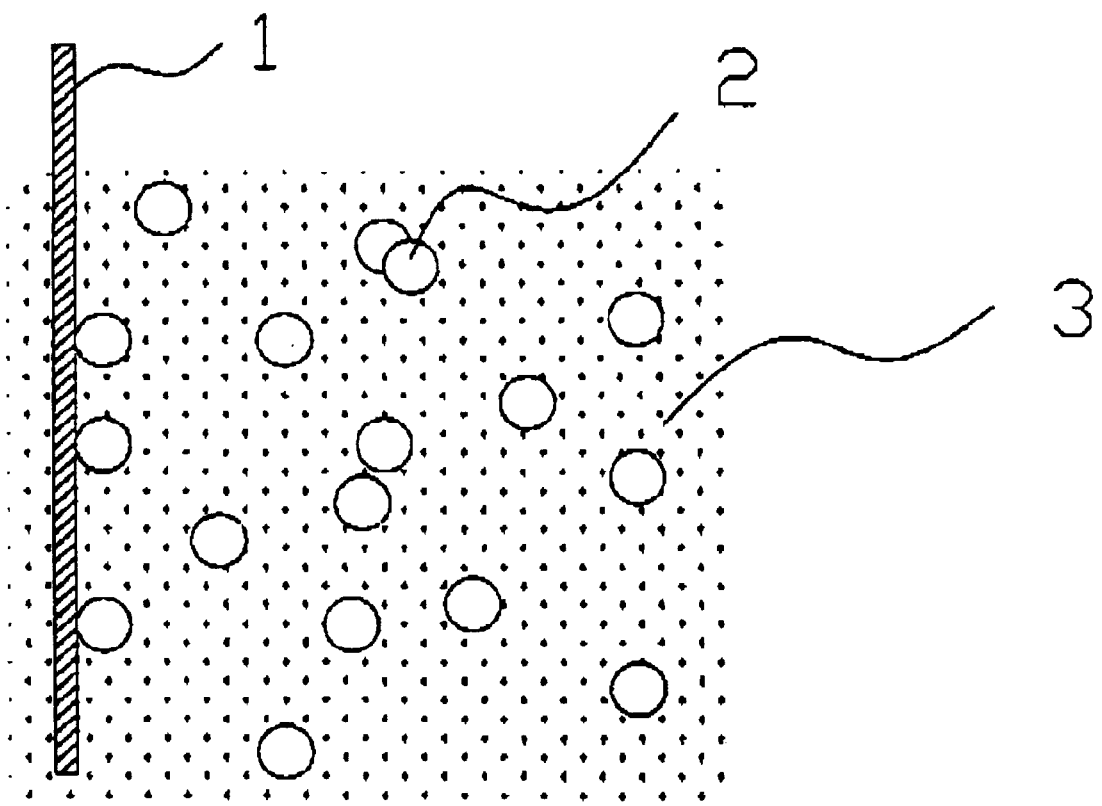
FIG. 1 is a view illustrative of a conventional method of preparing the conductive polymer material.

In accordance with the first present invention, a method of producing a conductive polymer comprises the following steps. An organic compound is deposited on a surface of a collector, wherein the organic compound has a polymerizability and is in a solid-state. The collector is made into contact with an electrolytic solution thereby to cause an electrolytic polymerization of said organic compound. As a result, large amount of reacted substances exist on the surface of the collector. The organic compound in the solid-state has been deposited on the collector before the collector is dipped into the electrolytic solution, whereby the electrolytic polymerization of the organic compound is caused. The organic compound in the solid-state is in contact with the collector in the electrolytic polymerization. This means that the organic compound is in contact with the collector at a high concentration, whereby a large current density of the electrolytic polymerization can be obtained, so that a productivity can be improved. Namely, in accordance with a novel method of producing a conductive polymer, a polymerizable organic compound in a solid-state on a collector is in contact with an electrolytic solution to cause an electrolytic polymerization of the organic compound at a high current density of the electrolytic polymerization, so that a productivity can be improved.

The conductive polymer material means a polymer which is obtained by an electrolytic polymerization of the organic compound. The polymerizable organic compound means an organic compound having a molecular structure which has a polymerizable site for allowing the organic compound is polymerized in the electrolytic polymerization thereby forming the conductive polymer.

In accordance with a novel method of producing a conductive polymer, a polymerizable organic compound in a solid-state on a collector is in contact with an electrolytic solution to cause an electrolytic polymerization of the organic compound, so that almost no diffusion of the organic compound in the electrolytic solution is caused, whereby the polymerization of the organic compound is sequentially progressed. As a result, the high current density of the electrolytic polymerization is ensured to increase the polymerization rate or shorten the necessary time for the polymerization. The solid-state organic compound on the collector surface is concurrently subjected to the polymerization whereby a large amount of the conductive polymer can be obtained at one time. Further, the obtained conductive polymer remains or is fixed on the collector surface. No isolation of the conductive polymer from the electrolytic solution nor subsequent recovery of the conductive polymer is necessary, whereby the productivity can be improved.

It is possible that at least a different organic compound from the organic compound is further deposited on the surface of the collector before the collector is made into contact with said electrolytic solution, provided that the different organic compound is polymerizable to form a co-polymer with the organic compound. Namely, the conductive co-polymer can be obtained. A compositional ratio of the conductive co-polymer can easily be changed by changing a ratio in amount of the organic compound to the different organic compound.

It is possible that the electrolytic solution includes the same organic compound dissolved therein as the organic compound deposited on the surface of the collector. The same organic compound has already been dissolved in the electrolytic solution before the organic compound deposited on the collector surface is made into contact with the electrolytic solution, thereby preventing any substantive elution of the organic compound into the electrolytic solution during the electrolytic polymerization, and also thereby causing concurrent electrolytic polymerization of not only the organic compound deposited on the collector surface but also the same organic compound dissolved in the electrolytic solution. As a result, an amount of the obtained polymer can be improved and the productivity can be obtained.

It is also possible that the electrolytic solution includes the same organic compound dissolved therein as the different organic compound additionally deposited on the surface of the collector. The same organic compound as the different organic compound additionally deposited on the surface of the collector has already been dissolved in the electrolytic solution before the different organic compound deposited on the collector surface is made into contact with the electrolytic solution, thereby preventing any substantive elution of the different organic compound into the electrolytic solution during the electrolytic co-polymerization, and also thereby causing concurrent electrolytic co-polymerization of not only the organic compound and the different organic compound deposited on the collector surface but also the same organic compounds as them dissolved in the electrolytic solution. As a result, an amount of the obtained co-polymer can be improved and the productivity can be obtained.

In accordance with the second present invention, a method of producing a conductive polymer comprises the following steps. A film including an organic compound is formed on a surface of a collector. The collector is then made into contact with an electrolytic solution thereby to cause an electrolytic polymerization of the organic compound. As a result, large amount of reacted substances exist on the surface of the collector. The film including the organic compound has been formed on the collector before the collector is dipped into the electrolytic solution, whereby the electrolytic polymerization of the organic compound is caused. The organic compound is in contact with the collector in the electrolytic polymerization. This means that the organic compound is in contact with the collector at a high concentration, whereby a large current density of the electrolytic polymerization can be obtained, so that a productivity can be improved. Namely, in accordance with a novel method of producing a conductive polymer, a polymerizable organic compound in the film on a collector is in contact with an electrolytic solution to cause an electrolytic polymerization of the organic compound at a high current density of the electrolytic polymerization, so that a productivity can be improved.

In accordance with the second novel method of producing a conductive polymer, the film including the organic compound on a collector is in contact with an electrolytic solution to cause an electrolytic polymerization of the organic compound, so that almost no diffusion of the organic compound in the electrolytic solution is caused, whereby the polymerization of the organic compound is sequentially progressed. As a result, the high current density of the electrolytic polymerization is ensured to increase the polymerization rate or shorten the necessary time for the polymerization. The organic compound on the collector surface is concurrently subjected to the polymerization whereby a large amount of the conductive polymer can be obtained at one time. Further, the obtained conductive polymer remains or is fixed on the collector surface. No isolation of the conductive polymer from the electrolytic solution nor subsequent recovery of the conductive polymer, whereby the productivity can be improved.

It is possible that the film further includes a different organic compound from the organic compound, provided that the different organic compound is polymerizable to form a co-polymer with said organic compound. Namely, the conductive co-polymer can be obtained. A compositional ratio of the conductive co-polymer can easily be changed by changing a ratio in amount of the organic compound to the different organic compound.

It is possible that the electrolytic solution includes the same organic compound dissolved therein as the organic compound included in the film. The same organic compound has already been dissolved in the electrolytic solution before the organic compound deposited on the collector surface is made into contact with the electrolytic solution, thereby preventing any substantive elution of the organic compound into the electrolytic solution during the electrolytic polymerization, and also thereby causing concurrent electrolytic polymerization of not only the organic compound included in the film but also the same organic compound dissolved in the electrolytic solution. As a result, an amount of the obtained polymer can be improved and the productivity can be obtained.

It is also possible that the electrolytic solution includes the same organic compound dissolved therein as the different organic compound additionally included in the film. The same organic compound as the different organic compound additionally included in the film has already been dissolved in the electrolytic solution before the different organic compound deposited on the collector surface is made into contact with the electrolytic solution, thereby preventing any substantive elution of the different organic compound into the electrolytic solution during the electrolytic co-polymerization, and also thereby causing concurrent electrolytic co-polymerization of not only the organic compound and the different organic compound included in the film but also the same organic compounds as them dissolved in the electrolytic solution. As a result, an amount of the obtained co-polymer can be improved and the productivity can be obtained.

In accordance with the third present invention, a method of forming an electrode using a conductive polymer comprises the following steps. An organic compound is deposited on a surface of a collector, wherein said organic compound has a polymerizability and is in a solid-state. The collector is made into contact with an electrolytic solution thereby to cause an electrolytic polymerization of said organic compound. As a result, large amount of reacted substances exist on the surface of the collector. The organic compound in the solid-state has been deposited on the collector before the collector is dipped into the electrolytic solution, whereby the electrolytic polymerization of the organic compound is caused. The organic compound in the solid-state is in contact with the collector in the electrolytic polymerization. This means that the organic compound is in contact with the collector at a high concentration, whereby a large current density of the electrolytic polymerization can be obtained, so that a productivity can be improved. Namely, in accordance with a novel method of producing a conductive polymer, a polymerizable organic compound in a solid-state on a collector is in contact with an electrolytic solution to cause an electrolytic polymerization of the organic compound at a high current density of the electrolytic polymerization, so that a productivity can be improved.

The conductive polymer material means a polymer which is obtained by an electrolytic polymerization of the organic compound. The polymerizable organic compound means an organic compound having a molecular structure which has a polymerizable site for allowing the organic compound is polymerized in the electrolytic polymerization thereby forming the conductive polymer.

In accordance with a novel method of producing a conductive polymer, a polymerizable organic compound in a solid-state on a collector is in contact with an electrolytic solution to cause an electrolytic polymerization of the organic compound, so that almost no diffusion of the organic compound in the electrolytic solution is caused, whereby the polymerization of the organic compound is sequentially progressed. As a result, the high current density of the electrolytic polymerization is ensured to increase the polymerization rate or shorten the necessary time for the polymerization. The solid-state organic compound on the collector surface is concurrently subjected to the polymerization whereby a large amount of the conductive polymer can be obtained at one time. Further, the obtained conductive polymer remains or is fixed on the collector surface. No isolation of the conductive polymer from the electrolytic solution nor subsequent recovery of the conductive polymer, whereby the productivity can be improved.

It is possible that at least a different organic compound from the organic compound is further deposited on the surface of the collector before the collector is made into contact with said electrolytic solution, provided that the different organic compound is polymerizable to form a co-polymer with the organic compound. Namely, the conductive co-polymer can be obtained. A compositional ratio of the conductive co-polymer can easily be changed by changing a ratio in amount of the organic compound to the different organic compound.

It is possible that the electrolytic solution includes the same organic compound dissolved therein as the organic compound deposited on the surface of the collector. The same organic compound has already been dissolved in the electrolytic solution before the organic compound deposited on the collector surface is made into contact with the electrolytic solution, thereby preventing any substantive elution of the organic compound into the electrolytic solution during the electrolytic polymerization, and also thereby causing concurrent electrolytic polymerization of not only the organic compound deposited on the collector surface but also the same organic compound dissolved in the electrolytic solution. As a result, an amount of the obtained polymer can be improved and the productivity can be obtained.

It is also possible that the electrolytic solution includes the same organic compound dissolved therein as the different organic compound additionally deposited on the surface of the collector. The same organic compound as the different organic compound additionally deposited on the surface of the collector has already been dissolved in the electrolytic solution before the different organic compound deposited on the collector surface is made into contact with the electrolytic solution, thereby preventing any substantive elution of the different organic compound into the electrolytic solution during the electrolytic co-polymerization, and also thereby causing concurrent electrolytic co-polymerization of not only the organic compound and the different organic compound deposited on the collector surface but also the same organic compounds as them dissolved in the electrolytic solution. As a result, an amount of the obtained co-polymer can be improved and the productivity can be obtained.

In accordance with the second present invention, a method of producing a conductive polymer comprises the following steps. A film including an organic compound is formed on a surface of a collector. The collector is then made into contact with an electrolytic solution thereby to cause an electrolytic polymerization of the organic compound. As a result, large amount of reacted substances exist on the surface of the collector. The film including the organic compound has been formed on the collector before the collector is dipped into the electrolytic solution, whereby the electrolytic polymerization of the organic compound is caused. The organic compound is in contact with the collector in the electrolytic polymerization. This means that the organic compound is in contact with the collector at a high concentration, whereby a large current density of the electrolytic polymerization can be obtained, so that a productivity can be improved. Namely, in accordance with a novel method of producing a conductive polymer, a polymerizable organic compound in the film on a collector is in contact with an electrolytic solution to cause an electrolytic polymerization of the organic compound at a high current density of the electrolytic polymerization, so that a productivity can be improved.

In accordance with the fourth novel method of forming an electrode using a conductive polymer, the film including the organic compound on a collector is in contact with an electrolytic solution to cause an electrolytic polymerization of the organic compound, so that almost no diffusion of the organic compound in the electrolytic solution is caused, whereby the polymerization of the organic compound is sequentially progressed. As a result, the high current density of the electrolytic polymerization is ensured to increase the polymerization rate or shorten the necessary time for the polymerization. The organic compound on the collector surface is concurrently subjected to the polymerization whereby a large amount of the conductive polymer can be obtained at one time. Further, the obtained conductive polymer remains or is fixed on the collector surface. No isolation of the conductive polymer from the electrolytic solution nor subsequent recovery of the conductive polymer, whereby the productivity can be improved.

It is possible that the film further includes a different organic compound from the organic compound, provided that the different organic compound is polymerizable to form a co-polymer with said organic compound. Namely, the conductive co-polymer can be obtained. A compositional ratio of the conductive co-polymer can easily be changed by changing a ratio in amount of the organic compound to the different organic compound.

It is possible that the electrolytic solution includes the same organic compound dissolved therein as the organic compound included in the film. The same organic compound has already been dissolved in the electrolytic solution before the organic compound deposited on the collector surface is made into contact with the electrolytic solution, thereby preventing any substantive elution of the organic compound into the electrolytic solution during the electrolytic polymerization, and also thereby causing concurrent electrolytic polymerization of not only the organic compound included in the film but also the same organic compound dissolved in the electrolytic solution. As a result, an amount of the obtained polymer can be improved and the productivity can be obtained.

It is also possible that the electrolytic solution includes the same organic compound dissolved therein as the different organic compound additionally included in the film. The same organic compound as the different organic compound additionally included in the film has already been dissolved in the electrolytic solution before the different organic compound deposited on the collector surface is made into contact with the electrolytic solution, thereby preventing any substantive elution of the different organic compound into the electrolytic solution during the electrolytic co-polymerization, and also thereby causing concurrent electrolytic co-polymerization of not only the organic compound and the different organic compound included in the film but also the same organic compounds as them dissolved in the electrolytic solution. As a result, an amount of the obtained co-polymer can be improved and the productivity can be obtained.

Figure 2:
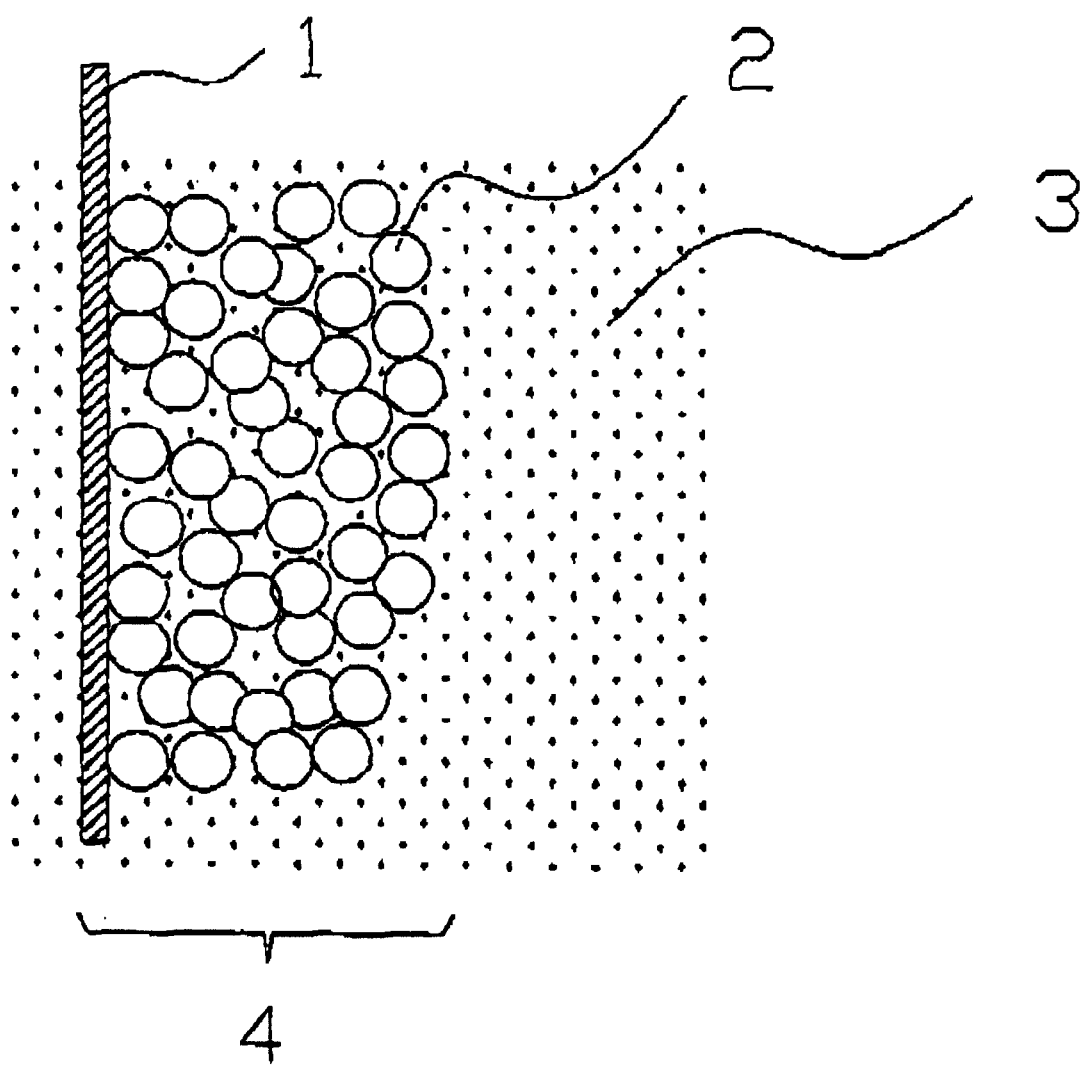
FIG. 2 is a view illustrative of a novel method of preparing the conductive polymer material in accordance with the present invention.

FIG. 2 is a view illustrative of a novel method of preparing the conductive polymer material in accordance with the present invention. The conductive polymer of the present invention can be obtained by electrolytic polymerization of organic compound. Available organic compounds are monomers or low molecular weight polymers, which have a skeleton allowing formation of the conductive polymer through the electrolytic polymerization. Available organic compounds may, for example, be organic compounds having an aniline skeleton such as aminonaphthalene and its derivatives represented by the following general formula (1), aminonaphthoquinone and its derivatives represented by the following general formula (2), aminoanthraquinone and its derivatives represented by the following general formula (3), aminoanthracene and its derivatives represented by the following general formula (4), aminopentacene and its derivatives represented by the following general formula (5), aminopentacenequinone and its derivatives represented by the following general formula (6), aminopentacenetetorone and its derivatives represented by the following general formula (7).

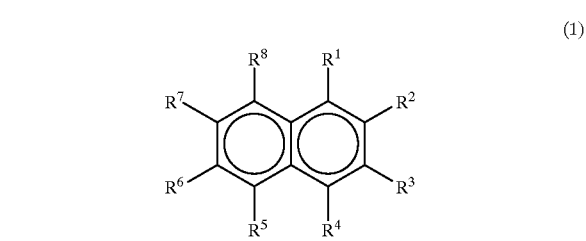

(1)

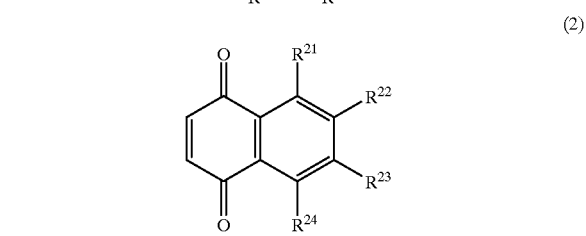

(2)

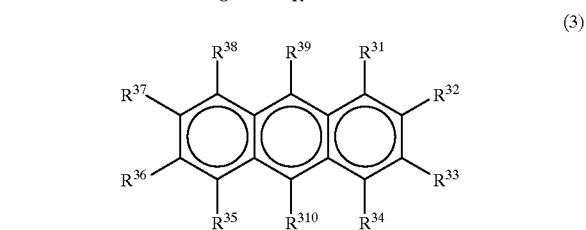

(3)

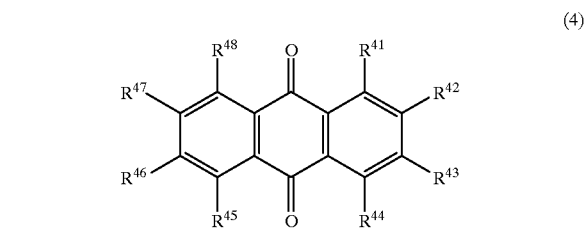

(4)

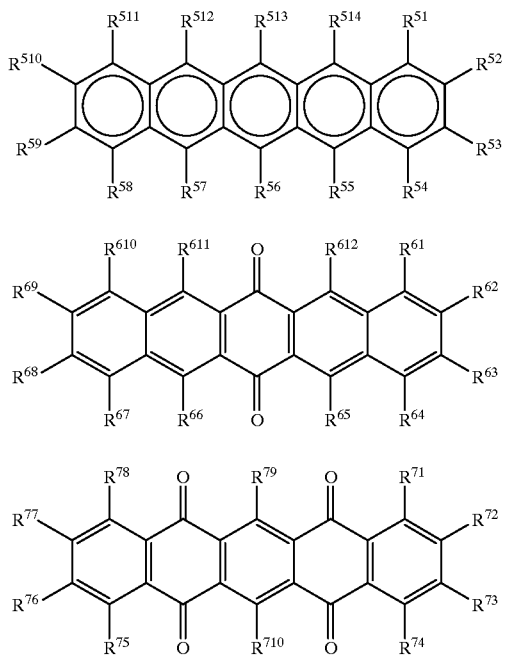

where at least one of $R^1$–$R^8$, $R^{21}$–$R^{24}$, $R^{31}$–$R^{310}$, $R^{41}$–$R^{48}$, $R^{51}$–$R^{514}$, $R^{61}$–$R^{612}$, and $R^{71}$–$R^{710}$ is amino groups, individuals of remainders may be hydrogen atom, halogen atom, hydroxyl groups, sulfonic groups, sulfuric acid groups, nitro groups, alkylthio groups, arylthio groups, alkoxyl groups, allyloxy groups, formile groups (—COH), ketone groups (—COR$^{11}$), ester groups (—CO$_2$R$^{12}$) or (—OCOR$^{13}$), amide groups (—NR$^{14}$COR$^{15}$) or (—CONR$^{16}$R$^{17}$), heteroaryl groups, cyano groups, and divalent hydrocarbon groups which may include an unsaturated bonding, where $R^{11}$–$R^{17}$ may be hydrogen atom, alkyl groups, aryl groups or heteroaryl groups.

Further available organic compounds may be, for example, organic compounds having a molecular structure with a heterocyclic skeleton such as pyrrole, thiophene, oxazoline, imidazol, indole, and benzothiophene.

Further more available organic compounds may be, for example, organic compounds polymerizable to form polyphenylene polymers such as polyparaphenylene or polymerizable to form rudder-polymers.

The available organic compounds are, however, limited to the above compounds. Any other organic compounds having the skeleton allowing formation of the conductive polymers may be available.

A single kind or plural kinds of the organic compounds may be available to form conductive polymers or conductive co-polymers. A ratio of the different kinds of organic compounds may be changed to change the compositional ratio of the co-polymer.

The above alkyl groups may, for example, be methyl groups, ethyl groups, propyl groups, isopropyl groups, n-butyl groups, sec-butyl groups, tert-butyl groups, pentyl groups, cyclopentyl groups, hexyl groups, cyclohexyl groups, heptyl groups, octyl groups, 2-ethylhexyl groups, decyl groups, undecyl groups, dodecyl groups, and dococyl groups.

The above aryl groups may, for example, be phenyl groups, biphenyl groups, naphthyl groups, anthracenyl groups, and diphenylphenyl groups.

The above heteroaryl groups may, for example, be pyridyl groups, quinolinidyl groups, and pyradyl groups.

The above allylene groups may, for example, be phenyl groups, biphenyl groups, naphthyl groups, anthracenyl groups, and diphenylphenyl groups.

The above heteroallylene groups may, for example, be polyaniline groups, polypyrrole groups, polythiophene groups, polyphenylenevinylene groups, arylthio groups, pyridyl groups, pyrimidyl groups, pyridadyl groups, triazine groups, quinolinidyl groups, and pyradyl groups.

The method of producing the above conductive polymer and the method of forming the electrode using the above conductive polymer will be described.

An organic compound 2 is mixed with a conductive auxiliary substance to form a mixture. This mixture is then deposited on a surface of the collector 1 to form a film on the surface of the collector 1. The film is dried to form an electrode 4. An electrolytic solution 3 dissolved with a dopant is prepared. The electrode 4 is dipped into the electrolytic solution 3. By use of an opposite electrode of platinum, a constant voltage is applied to a reference electrode to carry out an electrolytic polymerization of the organic compounds on the collector surface thereby to form a conductive polymer on the collector surface. As a result, the electrode using the conductive polymer is formed. No isolation of the conductive polymer nor subsequent recovery thereof are necessary.

The electrolytic polymerization is carried out by dipping the electrode 4 into the electrolytic solution 3 and also applying an oxidation voltage to the reference electrode with use of the opposite electrode made of platinum or applying an oxidation current between the electrodes. The polymerization may be carried out by use of three electrodes or two electrodes. A potential sweeping polymerization method, a constant potential polymerization method, a constant current polymerization method, a potential-step polymerization method and a pulse-voltage polymerization method are, for example, available.

Available conductive auxiliary substances may, for example, be substances which ensure conductivity such as carbon black, crystal carbon, and non-crystal carbon. A binder may optionally be used to fix the organic compound 2 and the conductive auxiliary substance onto the collector 1. Available binder may, for example, be organic resin binders such as polyvinylidene fluoride. A ratio in mixing of the organic compound to the conductive auxiliary substance and the binder may be optional. If the ratio of the organic compound to the conductive auxiliary substance and the binder is too low, it is possible that the production efficient is low. If an amount of the binder is too high, then it is possible that the electrolytic polymerization is suppressed. It is preferable that a ratio in content of the organic compound 2 to the electrode 4 is not less than 30% by weight. It is also preferable that a ratio in content of the binder to the electrode 4 is not more than 20% by weight.

It is also possible to use the electrolytic solution 3 already dissolved with the same organic compound as the organic compound 2 for dipping the electrode 4 into the electrolytic solution 3, thereby preventing any substantive elution of the organic compound 2 in the electrode 4 into the electrolytic solution 3, and also thereby allowing concurrent electrolytic polymerization of not only the organic compound 2 in the electrode 4 but also the same organic compound dissolved in the electrolytic solution 3. As a result, a polymerization amount in a unit time and in a unit are is increased. In this case, It is preferable that a solvent for the electrolytic solution 3 has a solubility to the organic compound 2 in the range of 0.01–50% by weight. If the solubility of the solvent is too high, then it is possible that the organic compound 2 is eluted into the electrolytic solution 3, whereby the production efficient is low. If a solvent insoluble to the organic compound 2 is used for the electrolytic solution 3, then almost no polymerization of the organic compound 2 is caused, whereby no conductive polymer can be obtained. It is preferable that the solvent to be used for the electrolytic solution 3 has a solubility to the organic compound 2 in the range of 0.01–10% by weight. If the solvent having the solubility to the organic compound 2 in the range of 0.01–10% by weight is used, then the yield of the conductive polymer can be improved without any substantive elution of the organic compound 2 to the electrolytic solution 3. The solvent for the electrolytic solution 3 may be either water or organic solvents.

An electrolyte to be dissolved into water to prepare the electrolytic solution 3 may be a salt which is soluble to water and ensures an ion-conductivity, for example, alkali metal salts, alkaline earth metal salts, organic sulfonate, sulfate, nitrate, and perchlorate. The available electrolyte is not limited in kind and concentration in water.

An electrolyte to be dissolved into an organic solvent to prepare the electrolytic solution 3 may be a salt which is soluble to the organic solvent and ensures an ion-conductivity. The available electrolyte is not limited in kind and concentration in the solvent. Optionally, it is possible to use a protic acid of the salt or add proton source.

As described above, in accordance with the present invention, a polymerizable organic compound in a solid-state on a collector is in contact with an electrolytic solution to cause an electrolytic polymerization of the organic compound, so that almost no diffusion of the organic compound in the electrolytic solution is caused, whereby the polymerization of the organic compound is sequentially progressed. As a result, the high current density of the electrolytic polymerization is ensured to increase the polymerization rate or shorten the necessary time for the polymerization. The solid-state organic compound on the collector surface is concurrently subjected to the polymerization whereby a large amount of the conductive polymer can be obtained at one time. Further, the obtained conductive polymer remains or is fixed on the collector surface. No isolation of the conductive polymer from the electrolytic solution nor subsequent recovery of the conductive polymer, whereby the productivity can be improved.

The following descriptions are examples 1–4 and comparative examples 1–2. In order to have experimental conditions uniform to other examples and comparative examples, the following conditions were set. An amount of the electrolytic solution 3 was 25 ml. An area of the electrode 4 was 6 cm². The organic compound 2 is concentrated and fixed on the collector 1, wherein each electrode 4 includes 75 mg of the organic compound 2. The same organic compound as the organic compound 2 was dissolved into the electrolytic solution 3 so that the electrolytic solution was saturated. 0.3% by weight of the organic compound 2 was dissolved into a polyvinyl sulfonic acid solution. Namely, 75 mg of the organic compound 2 was dissolved into 25 ml of the electrolytic solution 3. 0.1% by weight of the organic compound 2 was dissolved into a propylene carbonate solution. Namely, 30 mg of the organic compound 2 was dissolved into 25 ml of the electrolytic solution 3.

EXAMPLE 1

The organic compound 2 was diaminoanthraquinone having a molecular structure which has two of aminobenzene which allows formation of polyaniline skeleton.

1,5-diaminoanthraquinone represented by the following general formula (8) as the organic compound 2 was mixed with a crystal carbon as the conductive auxiliary substance to form a mixture. As a binder, polyvinylidene fluoride was added to the mixture to form a paste. This paste is applied onto a surface of the collector 1 by a screen method to form a film on the collector 1. A ratio of 1,5-diaminoanthraquinone:the crystal carbon:polyvinylidene fluoride was 46:46:8.

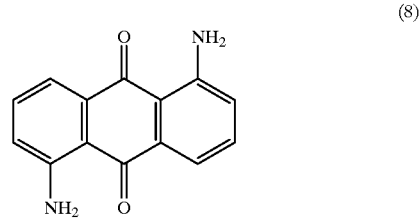

(8)

Figure 3:
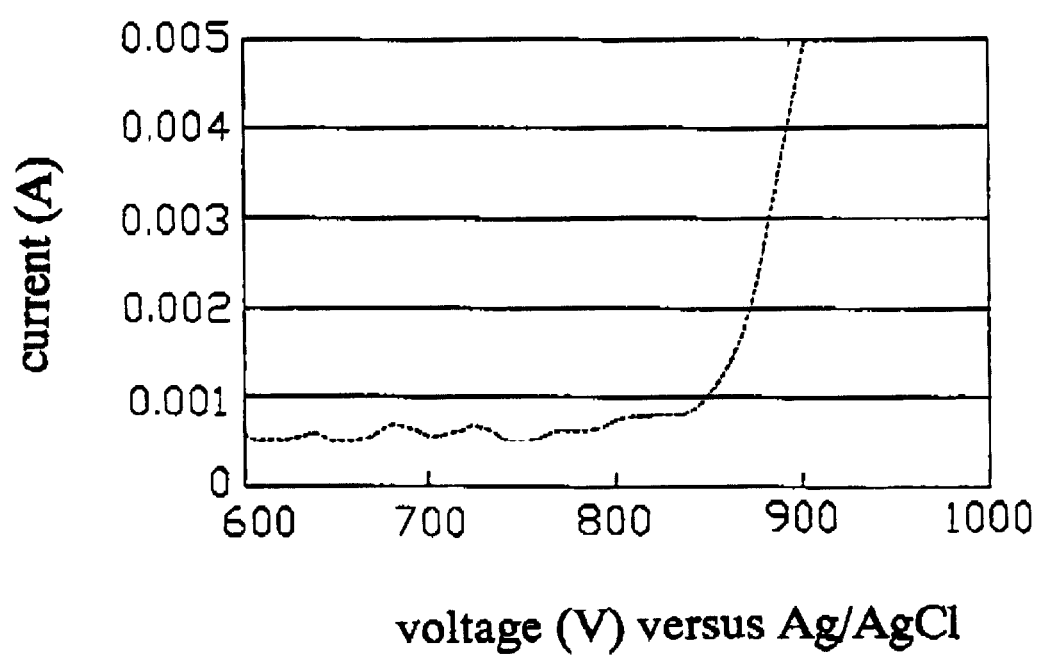
FIG. 3 is a diagram illustrative of a current-voltage characteristic of 1,5-diaminoanthraquinone, wherein voltage corresponds to oxidation potential.

As the electrolytic solution 3, an organic sulfonic acid, for example, a polyvinyl sulfonic acid solution of 6 mol was used. Anions of polyvinyl sulfonic acid serve as dopant to 1,5-diaminoanthraquinone. An electrolytic polymerization was carried out in a potential sweep polymerization method FIG. 3 is a diagram illustrative of a current-voltage characteristic of 1,5-diaminoanthraquinone, wherein voltage corresponds to oxidation potential. It was confirmed that the oxidation potential of 1,5-diaminoanthraquinone was about 280 mV versus Ag/AgCl (reference electrode) The electrolytic polymerization was carried out at a potential sweep range of 200–1000 mV versus Ag/AgCl, and at a potential sweep rate of 20 mV/sec.

Figure 4:
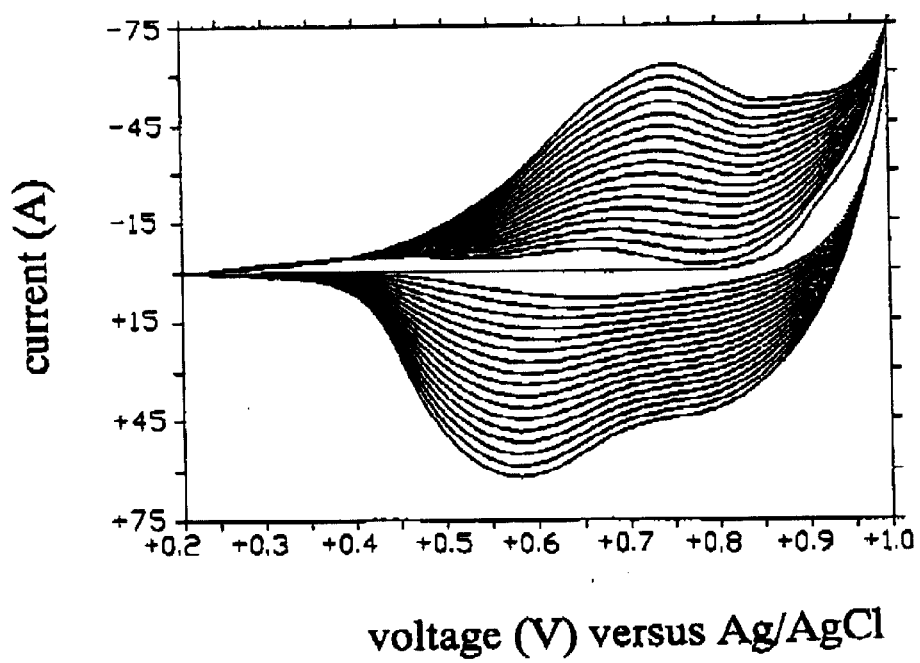
FIG. 4 is a diagram illustrative of cyclic voltamogram in polymerization of 1,5-diaminoanthraquinone.

FIG. 4 is a diagram illustrative of cyclic voltamogram in polymerization of 1,5-diaminoanthraquinone. It was confirmed that as the time of voltage sweeping is increased, the current value is also increased due to formation of the conductive polymer on the collector 1. The polymerization was terminated when the increase of current is stopped at about 600 mV versus Ag/AgCl.

In this example, poly-diaminoanthraquinone represented by the following general formula (9) was obtained as the conductive polymer. The obtained amount of poly-diaminoanthraquinone as the conductive polymer was greater by 0.6% by weight than the used amount of 1,5-diaminoanthraquinone as the organic compound. The increase in weight of the poly-diaminoanthraquinone as the conductive polymer from the 1,5-diaminoanthraquinone as the organic compound was due to a difference between a weight increment by anions of polyvinyl sulfonic acid as the dopant and a weight decrement by elution of 1,5-diaminoanthraquinone into the electrolytic solution 3.

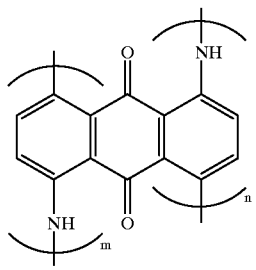

(9)

where "m" and "n" represent polymerization degrees, respectively.

The polymerization amount at a unit time and a unit area was 2.5 mg/(cm²h). The yield as a ratio of obtained conductive polymer to 1,5-diaminoanthraquinone was 101.3%. An efficient of polymerization was high and the yield was also high.

EXAMPLE 2

The organic compound 2 was diaminoanthraquinone having a molecular structure which has two of aminobenzene which allows formation of polyaniline skeleton.

1,5-diaminoanthraquinone as the organic compound 2 was mixed with a crystal carbon as the conductive auxiliary substance to form a mixture. As a binder, polyvinylidene fluoride was added to the mixture to form a paste. This paste is applied onto a surface of the collector 1 by a screen method to form a film on the collector 1. A ratio of 1,5-diaminoanthraquinone:the crystal carbon:polyvinylidene fluoride was 46:46:8.

For the electrolytic solution 3, propylene carbonate was used as a solvent and 1 mol of triethylmethylammonium tetrafluoroborate was used as a supporting electrolyte. Further, 0.1 mol of trifluoroacetic acid was added as a proton source. Ag/Ag+ reference electrode was used. An electrolytic polymerization was carried out in a potential sweep polymerization method, wherein the potential sweep range was 200–1000 mV versus Ag/Ag+, and the potential sweep rate was 20 mV/sec.

Figure 5:
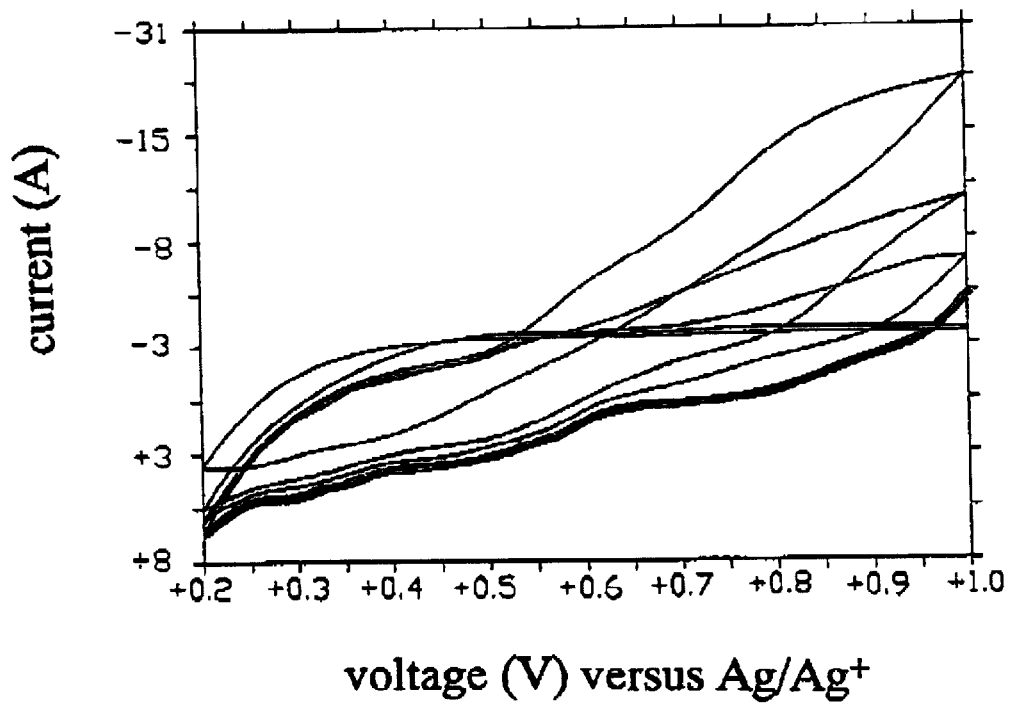
FIG. 5 is a diagram illustrative of a current-voltage characteristic of 1,5-diaminoanthraquinone, wherein voltage corresponds to oxidation potential.

FIG. 5 is a diagram illustrative of a current-voltage characteristic of 1,5-diaminoanthraquinone, wherein voltage corresponds to oxidation potential. As the time of voltage sweeping is increased, the current value is decreased due to formation of the conductive polymer on the collector 1. The polymerization was terminated when the variation of current is stopped. The polymerization time of this example is about one sixth of the polymerization time of the above example 1.

In this example, poly-diaminoanthraquinone was obtained as the conductive polymer. The obtained amount of poly-diaminoanthraquinone as the conductive polymer was lower by 2.1% by weight than the used amount of 1,5-diaminoanthraquinone as the organic compound. The decrease in weight of the poly-diaminoanthraquinone as the conductive polymer from the 1,5-diaminoanthraquinone as the organic compound was due to a difference between a weight increment by the dopant and a weight decrement by elution of 1,5-diaminoanthraquinone into the electrolytic solution 3.

The polymerization amount at a unit time and a unit area was 10.4 mg/(cm²h). The yield as a ratio of obtained conductive polymer to 1,5-diaminoanthraquinone was 96.6%. An efficient of polymerization was high and the yield was also high.

EXAMPLE 3

The organic compound 2 was diaminoanthraquinone having a molecular structure which has two of aminobenzene which allows formation of polyaniline skeleton.

1,5-diaminoanthraquinone as the organic compound 2 was mixed with a crystal carbon as the conductive auxiliary substance to form a mixture. As a binder, polyvinylidene fluoride was added to the mixture to form a paste. This paste is applied onto a surface of the collector 1 by a screen method to form a film on the collector 1. A ratio of 1,5-diaminoanthraquinone:the crystal carbon:polyvinylidene fluoride was 46:46:8.

For the electrolytic solution 3, a 6-mol polyvinyl sulfonic acid solution which is saturated with 1,5-diaminoanthraquinone was used. A solubility of 1,5-diaminoanthraquinone to 6 mol of polyvinyl sulfonic acid solution is 0.3% by weight, 7.5 ml of 1,5-diaminoanthraquinone was dissolved into 25 ml of the electrolytic solution 3 to prepare the saturated electrolytic solution 3. An electrolytic polymerization was carried out under the same condition as example 1, for example, in a potential sweep polymerization method, wherein the potential sweep range was 200–1000 mV versus Ag/AgCl, and the potential sweep rate was 20 mV/sec.

In this example, poly-diaminoanthraquinone was obtained as the conductive polymer. The obtained amount of poly-diaminoanthraquinone as the conductive polymer was greater by 7.2% by weight than the used amount of 1,5-diaminoanthraquinone as the organic compound. The increase in weight of the poly-diaminoanthraquinone as the conductive polymer from the 1,5-diaminoanthraquinone as the organic compound was due to the sum of a weight increment by the dopant and a weight increment by further supplying 1,5-diaminoanthraquinone from the electrolytic solution into the electrode 4.

The polymerization amount at a unit time and a unit area was 2.68 mg/(cm²h). The yield as a ratio of obtained conductive polymer to 1,5-diaminoanthraquinone was 53.6%. An efficient of polymerization was high and the yield was also high.

EXAMPLE 4

In this example, in place of potential sweep polymerization method, a constant potential polymerization method was used for carrying out the electrolytic polymerization. The organic compound 2 was diaminoanthraquinone having a molecular structure which has two of aminobenzene which allows formation of polyaniline skeleton, 1,5-diaminoanthraquinone as the organic compound 2 was mixed with a crystal carbon as the conductive auxiliary substance to form a mixture. As a binder, polyvinylidene fluoride was added to the mixture to form a paste. This paste is applied onto a surface of the collector 1 by a screen method to form a film on the collector 1. A ratio of 1,5-diaminoanthraquinone:the crystal carbon:polyvinylidene fluoride was 46:46:8.

For the electrolytic solution 3, a 6-mol polyvinyl sulfonic acid solution which is saturated with 1,5-diaminoanthraquinone was used. A solubility of 1,5-diaminoanthraquinone to 6 mol of polyvinyl sulfonic acid solution is 0.3% by weight. 7.5 ml of 1,5-diaminoanthraquinone was dissolved into 25 ml of the electrolytic solution 3 to prepare the saturated electrolytic solution 3. An electrolytic polymerization was carried out in the constant potential polymerization method, wherein the potential was fixed at 950 mV versus Ag/AgCl.

In this example, poly-diaminoanthraquinone was obtained as the conductive polymer. The obtained amount of poly-diaminoanthraquinone as the conductive polymer was greater by 8.72% by weight than the used amount of 1,5-diaminoanthraquinone as the organic compound. The increase in weight of the poly-diaminoanthraquinone as the conductive polymer from the 1,5-diaminoanthraquinone as the organic compound was due to the sum of a weight increment by the dopant and a weight increment by further supplying 1,5-diaminoanthraquinone from the electrolytic solution into the electrode 4.

The polymerization amount at a unit time and a unit area was 11.3 mg/(cm$^2$h). The yield as a ratio of obtained conductive polymer to 1,5-diaminoanthraquinone was 54.3%. An efficient of polymerization was high and the yield was also high.

Comparative Example 1

The organic compound 2 was diaminoanthraquinone having a molecular structure which has two of aminobenzene which allows formation of polyaniline skeleton.

For the electrolytic solution 3, a 6-mol polyvinyl sulfonic acid solution which is saturated with 1,5-diaminoanthraquinone was used. A solubility of 1,5-diaminoanthraquinone to 6 mol of polyvinyl sulfonic acid solution is 0.3% by weight. 7.5 ml of 1,5-diaminoanthraquinone was dissolved into 25 ml of the electrolytic solution 3 to prepare the saturated electrolytic solution 3. The collector 1 was dipped into the electrolytic solution 3 saturated with 1,5-diaminoanthraquinone, so that an electrolytic polymerization was carried out under the same condition as example 1, for example, in a potential sweep polymerization method, wherein the potential sweep range was 200–1000 mV versus Ag/AgCl, and the potential sweep rate was 20 mV/sec.

In this example, poly-diaminoanthraquinone was obtained as the conductive polymer The polymerization amount at a unit time and a unit area was 0.155 mg/(cm$^2$h). The yield as a ratio of obtained conductive polymer to 1,5-diaminoanthraquinone was 2.48%. An efficient of polymerization was low and the yield was also low.

Comparative Example 2

The organic compound 2 was diaminoanthraquinone having a molecular structure which has two of aminobenzene which allows formation of polyaniline skeleton.

For the electrolytic solution 3, a propylene carbonate was used as a solvent. The electrolytic solution 3 which is saturated with 1,5-diaminoanthraquinone was used. 0.1 mol of trifluoroacetic acid and 1 mol of triethylmethylammonium tetrafluoroborate were added into the electrolytic solution 3. The collector 1 was dipped into the electrolytic solution 3 saturated with 1,5-diaminoanthraquinone, so that an electrolytic polymerization was carried out under the same condition as example 2, for example, in a potential sweep polymerization method, wherein the potential sweep range was 200–1000 mV versus Ag/Ag+, and the potential sweep rate was 20 mV/sec. The polymerization was terminated when no variation appears of the current as in example 2.

In this example, poly-diaminoanthraquinone was obtained as the conductive polymer. The polymerization amount at a unit time and a unit area was 0.104 mg/(cm$^2$h). The yield as a ratio of obtained conductive polymer to 1,5-diaminoanthraquinone was 4.16%. An efficient of polymerization was low and the yield was also low.

The following table 1 shows polymerization amounts of poly-diaminoanthraquinone and yields in the above examples 1–4 and the above comparative examples 1–2.

TABLE 1

|  | polymerization amount (mg(cm2h)) | yield (%) |
| --- | --- | --- |
| Ex. 1 | 2.5 | 101.3 |
| Ex. 2 | 10.4 | 96.6 |
| Ex. 3 | 2.68 | 53.6 |
| Comp. Ex. 1 | 0.155 | 2.48 |
| Comp. Ex. 2 | 0.104 | 4.16 |

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the Spirit and scope of the present invention.

What is claimed is:

1. A method of producing a conductive polymer, comprising the steps of:
    depositing at least an organic compound on a surface of a collector, wherein said organic compound has a polymerizability and is in a solid-state; and
    contacting said collector to an electrolytic solution to cause an electrolytic polymerization of said organic compound.

2. The method as claimed in claim 1, wherein at least a different organic compound from said organic compound is further deposited on said surface of said collector before said collector is made into contact with said electrolytic solution, provided that said different organic compound is polymerizable to form a co-polymer with said organic compound.

3. The method as claimed in claim 2, wherein said electrolytic solution includes the same organic compound dissolved therein as said different organic compound deposited on said surface of said collector.

4. The method as claimed in claim 1, wherein said electrolytic solution includes the same organic compound dissolved therein as said organic compound deposited on said surface of said collector.

5. A method of producing a conductive polymer, comprising the steps of:
    forming a film including at least an organic compound on a surface of a collector; and
    contacting said collector to an electrolytic solution to cause an electrolytic polymerization of said organic compound.

6. The method as claimed in claim 5, wherein said film further includes a different organic compound from said organic compound, provided that said different organic compound is polymerizable to form a co-polymer with said organic compound.

7. The method as claimed in claim 6, wherein said electrolytic solution includes the same organic compound dissolved therein as said different organic compound deposited on said surface of said collector.

8. The method as claimed in claim 5, wherein said electrolytic solution includes the same organic compound dissolved therein as said organic compound included in said film.

9. A method of forming an electrode using a conductive polymer, comprising the steps of:
    depositing at least an organic compound on a surface of a collector, wherein said organic compound has a polymerizability and is in a solid-state; and contacting said collector to an electrolytic solution to cause an electrolytic polymerization of said organic compound.

10. The method as claimed in claim 9, wherein at least a different organic compound from said organic compound is further deposited on said surface of said collector before said collector is made into contact with said electrolytic solution, provided that said different organic compound is polymerizable to form a co-polymer with said organic compound.

11. The method as claimed in claim 10, wherein said electrolytic solution includes the same organic compound dissolved therein as said different organic compound deposited on said surface of said collector.

12. The method as claimed in claim 9, wherein said electrolytic solution includes the same organic compound dissolved therein as said organic compound deposited on said surface of said collector.

13. A method of forming an electrode using a conductive polymer, comprising the steps of:

forming a film including at least an organic compound on a surface of a collector; and contacting said collector to an electrolytic solution to cause an electrolytic polymerization of said organic compound.

14. The method as claimed in claim 13, wherein said film further includes a different organic compound from said organic compound, provided that said different organic compound is polymerizable to form a co-polymer with said organic compound.

15. The method as claimed in claim 14, wherein said electrolytic solution includes the same organic compound dissolved therein as said different organic compound deposited on said surface of said collector.

16. The method as claimed in claim 13, wherein said electrolytic solution includes the same organic compound dissolved therein as said organic compound included in said film.

* * * * *